(12) United States Patent
Enenkl et al.

(10) Patent No.: US 9,888,232 B2
(45) Date of Patent: Feb. 6, 2018

(54) 3D MOTION PICTURE PROCESSING DEVICE

(75) Inventors: Michael Enenkl, Stuttgart (DE); Ralf Mueller, Wernau (DE)

(73) Assignee: SONY CORPORATION, Tokyo (JP)

( * ) Notice: Subject to any disclaimer, the term of this patent is extended or adjusted under 35 U.S.C. 154(b) by 867 days.

(21) Appl. No.: 13/348,194

(22) Filed: Jan. 11, 2012

(65) Prior Publication Data

US 2012/0182387 A1    Jul. 19, 2012

(30) Foreign Application Priority Data

Jan. 17, 2011  (EP) ..................................... 11151157

(51) Int. Cl.
*H04N 13/04* (2006.01)
*H04N 13/00* (2006.01)
*H04N 13/02* (2006.01)

(52) U.S. Cl.
CPC ..... *H04N 13/0438* (2013.01); *H04N 13/0029* (2013.01); *H04N 13/026* (2013.01)

(58) Field of Classification Search
CPC ........... H04N 13/0029; H04N 13/0438; H04N 13/026; H04N 9/04; H04N 5/04
See application file for complete search history.

(56) References Cited

U.S. PATENT DOCUMENTS

| 6,529,175 | B2 | 3/2003 | Tserkovnyuk et al. | |
| 7,113,188 | B2 | 9/2006 | Kuroda et al. | |
| 7,508,485 | B2 * | 3/2009 | Jacobs et al. | 352/62 |
| 7,522,257 | B2 | 4/2009 | Jacobs et al. | |
| 7,636,126 | B2 * | 12/2009 | Mallinson | 348/515 |
| 8,274,448 | B1 * | 9/2012 | Cook | 345/9 |
| 2001/0043265 | A1 | 11/2001 | Tetterington et al. | |
| 2003/0007070 | A1 * | 1/2003 | Lipton | H04N 13/0037 348/43 |
| 2005/0078108 | A1 * | 4/2005 | Swift et al. | 345/419 |
| 2008/0151040 | A1 * | 6/2008 | Kim | 348/42 |
| 2009/0015206 | A1 * | 1/2009 | Seman et al. | 320/134 |
| 2009/0051759 | A1 * | 2/2009 | Adkins et al. | 348/53 |
| 2010/0166056 | A1 * | 7/2010 | Perlman et al. | 375/240.01 |
| 2011/0126160 | A1 * | 5/2011 | Han et al. | 715/848 |
| 2011/0129198 | A1 * | 6/2011 | Toma et al. | 386/239 |

(Continued)

FOREIGN PATENT DOCUMENTS

KR    2002-0027413    4/2002

OTHER PUBLICATIONS

Virtual FX, "Virtual FX 3D Converter", http://www.razor3donline.com/converter.html, 2001-2009, 3 pages.

(Continued)

*Primary Examiner* — Tung Vo
*Assistant Examiner* — Joseph Becker
(74) *Attorney, Agent, or Firm* — Oblon, McClelland, Maier & Neustadt, L.L.P.

(57) ABSTRACT

The present invention relates to a 3D picture processing device comprising an input unit for receiving a video signal, an output unit for providing a video signal for a 2D display device, preferably a TV set, and a 3D shutter glasses driver unit for generating a driving signal to control 3D shutter glasses. A delay compensation unit is coupled to the driver unit and adapted to compensate for the processing delay present in the display device, preferably the TV set.

24 Claims, 2 Drawing Sheets

(56) References Cited

U.S. PATENT DOCUMENTS

2011/0279645 A1* 11/2011 Newton ............. H04N 13/0048
  348/43
2012/0169851 A1* 7/2012 Paczkowski .................... 348/53

OTHER PUBLICATIONS

David Richards, "Sony Launch 3D TV Dongle & IP TV Service", http://www.channelnews.com.au/Display/3DTV/S4E9F3A7?print=1, Feb. 23, 2010, 2 pages.
"Sky HD 3D TV", http://www.digitalspy.co.uk/forums/showthread.php?t=1000827, Mar. 9, 2009, 7 pages.

* cited by examiner

3D MOTION PICTURE PROCESSING DEVICE

CROSS-REFERENCE TO RELATED APPLICATION

This application claims priority of European patent application EP 11151157.2, filed on Jan. 17, 2011.

FIELD OF INVENTION

The present invention relates to a 3D picture, preferably motion picture, processing device comprising an input unit for receiving a video signal, an output unit for providing a video signal for a 2D display device, preferably a TV set, and a 3D shutter glasses driver unit for generating a driving signal to control 3D shutter glasses. The invention also relates to a method for processing a picture signal, preferably a motion picture signal, to be transmitted to a 2D display device, preferably a TV set, and a video game console comprising a 3D picture processing device.

BACKGROUND OF THE INVENTION

Three-dimensional (3D) motion pictures become more and more popular with the result that a rapidly increasing number of 3D content is available for users. However, in order to view 3D motion pictures, appropriate equipment is necessary. Typically, such equipment comprises a 3D TV set and so-called shutter glasses receiving their control signals from the TV set.

In the meantime there is also equipment available which allows to view 3D motion pictures with standard 2D TV sets. For example, the product "Virtual FX 3D Converter" by the company razor 3D is such an equipment. It is delivered with 3D shutter glasses, wherein the driving signals necessary for controlling the shutter glasses are generated and transmitted by the virtual FX 3D converter.

Although this 3D converter box is a practical approach to present 3D content with a standard 2D TV set, the quality of the displayed 3D content is not optimal and strongly depends on the used 2D TV set. In particular, the user perceives the pictures with blurring.

SUMMARY OF INVENTION

It is therefore an object of the present invention to provide a 3D picture processing device which overcomes the above-mentioned problem, particularly the problem of blurring.

This object is solved by the above-mentioned 3D picture processing device which additionally comprises a delay compensation unit coupled to the driver unit and adapted to compensate for the processing delay present in the display device.

The 3D picture processing device generates the driving signal for the 3D shutter glasses on the basis of the picture signal transmitted to the display device. Due to the fact that these picture signals, preferably motion picture signals, are also processed by the display device there is a time shift between transmitting the picture signals into the display device and their display on the screen of the display device. Therefore, the 3D shutter glasses are not in a proper synchronization with the left and right pictures displayed by the display device.

Therefore, the present invention proposes to delay the driving signals for the 3D shutter glasses by a delay value which reflects the processing time of the display device. As a result, the synchronization between the driving signals and the display of the respective left and right images on the screen of the display device is substantially improved.

The inventive delay compensation unit serves to apply a time delay or time shift by a predefined amount to the driving signals to be received by 3D shutter glasses.

Hence, one of the main aspects of the present invention is to compensate for the processing time which is required to process and display motion pictures within a display device.

Preferably, said 2D display device is a 2D TV set.

In a preferred embodiment, said delay compensation unit comprises a memory for storing a processing delay value. More preferably, said delay compensation unit comprises a requesting element adapted to request a processing delay value from the 2D display device, preferably the 2D TV set.

That is in other words that the amount of time shift or time delay to be applied to the driving signals is predefined and stored or alternatively is requested from the TV set. In this alternative, the manufacturer of the TV set stores a time delay value as a fixed value in an accessible memory. This embodiment has the advantage that the delay compensation unit may better handle different TV sets having different processing times.

In a further preferred embodiment, said delay compensation unit comprises a requesting element adapted to search a processing delay value in a look-up table storing processing delay values of a plurality of different TV sets.

In other words, the processing device comprises a memory storing a look-up table with a plurality of delay values of different TV sets. Such a look-up table may be provided by manufacturer of the 3D picture processing device in a read-only memory, for example. Alternatively, the look-up table may also be stored anywhere in the worldwide web and being accessible via the internet. In this case, the delay compensation unit may get the processing delay value via the internet on the basis of an identification feature of the coupled TV set.

In a further preferred embodiment, which could also be combined with the afore-mentioned embodiments, said delay compensation unit comprises a setting element for setting the delay manually.

This means in other words that the user is able to change the processing delay value manually which is a less complicated technical solution.

In a further preferred embodiment, an optical sensor adapted to detect picture elements displayed by the display device and a processing delay determining element coupled to said optical sensor and the output unit are provided. The processing delay determining element is adapted to determine the processing delay between the output of a video signal comprising said picture elements by said output unit and the display of said video signal by the display device.

That means in other words that the processing delay value used by the delay compensation unit is determined either by a separate calibration process or during operation. The picture elements to be displayed by the display device, e.g. a TV set, may be any graphical sign or pattern which may be detected by the optical sensor.

The advantage of this approach is that the processing delay value used by the delay compensation unit is very accurate and also compensates for any tolerances of the TV set or any other component having influence on the processing time.

In a further preferred embodiment, the processing device comprises an acoustical sensor adapted to detect sound elements reproduced by the display device and a processing delay determining element coupled to said acoustical sensor and the output unit and adapted to determine the processing delay between the output of a video signal comprising the sound elements by said output unit and the reproduction of said sound elements by the display device. At least in this embodiment, the display device comprises means for outputting sound, like loudspeakers.

In a further preferred embodiment, a 2D to 3D converter unit adapted to receive a 2D video signal and to output a 3D video signal is provided.

This measure has the advantage that also two-dimensional pictures, preferably motion pictures can be provided with a depth impression perceived by the user.

In a further preferred embodiment, a video signal converter unit is provided and adapted to receive an analogue or digital input video signal and to output a digital video signal. The input video signal is preferably one of a HDMI signal, a S-video signal, an RGB signal or an HFR (Higher Frame Rate) interface signal, and said output video signal is a HDMI signal or an HFR interface signal.

This means in other words that the inventive 3D picture processing device is able to handle a plurality of picture sources, preferably motion picture sources, namely analogue or digital sources, so that its usability is increased. Further, the output video signal is a HDMI signal, which is digital signal and allows to transmit 3D motion pictures.

In a further preferred embodiment, a picture format converter unit is provided and adapted to convert a 3D source format of the video signal into a 3D frame sequential format.

In the art a couple of different 3D picture (frame) formats are known and used. For example, there is a so-called side-by-side (SBS) format, the above/below (also called upper by lower) format, the frame sequential (FS) format or the checkerboard format. Since these formats are known to a person skilled in the art, they will not be described in detail below. The format converter is now adapted to provide a specific predefined format, preferably the 3D frame sequential format, at the output. The frame sequential format may be handled by a 2D display device, e.g. a TV set.

In a preferred embodiment, the 3D picture processing device is provided as a stand alone box operating independently of a display device, e.g. a TV set.

In other words, the inventive processing device is a separate apparatus, which can be bought by users as an addition to a 2D display device.

In a further preferred embodiment, said inventive processing device is part of a video game console. More preferably, said photo sensor is a camera coupled to said video game console.

The advantage of this measure is that the camera which is often already part of the video game console can also be used for detecting picture elements. Hence, additional optical sensors are not necessary.

The object of the present invention is also solved by a method for processing a picture signal, preferably a motion picture signal, to be transmitted to a 2D display device, preferably a TV set, comprising the steps:
  receiving an 2D or 3D motion picture signal from a source,
  generating a driving signal to control 3D shutter glasses,
  providing an 3D motion picture signal to be transmitted to said 2D display device, and
  applying a processing delay to the driving signal as to compensate for the processing time of said display device.

The advantages of this inventive method are the same as described in connection with the inventive processing device so that it is referred to the above description. In a preferred embodiment, said processing delay is determined by a delay value stored in a memory.

In a preferred embodiment, the method comprises the steps:
  detecting picture elements displayed by said display device, and
  determining the processing delay between providing the motion picture signal comprising said picture elements and detecting said picture elements.

Preferably, the method comprises the step of generating picture elements and to display said elements at a predefined location on the display of the display device.

In a further preferred embodiment, the source format of the video signal is converted into a frame sequential format.

It is to be noted that the claimed method has similar and/or identical preferred embodiments as the claimed 3D picture processing device and as defined in the dependent claims.

Further features and advantages can be taken from the following description and the enclosed drawings. It is to be understood that the features mentioned above and those yet to be explained below can be used not only in the respective combinations indicated, but also in other combinations or in isolation, without leaving the scope of the present invention.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

In the following description, numerous specific details are set forth to provide a thorough description of the invention. However, it will be apparent to one skilled in the art that the invention may be practised without these specific details. In other instances, well-known features have not been described in detail so as not to obscure the invention.

Figure 1:
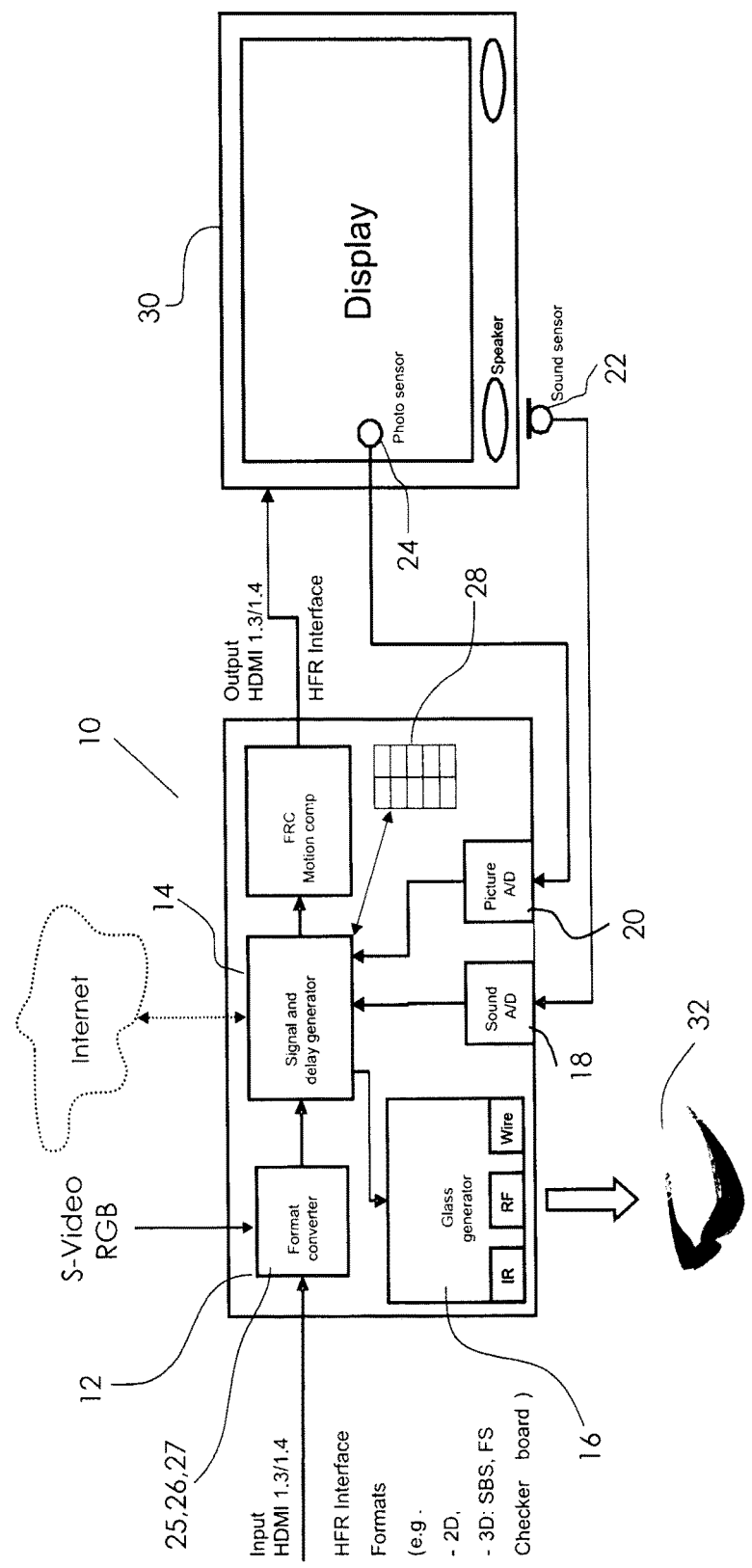
FIG. 1 shows a schematic block diagram of a first embodiment of the 3D motion picture processing device.

In FIG. 1 a 3D picture processing device is schematically shown and indicated with reference numeral 10. It is to be noted that the 3D picture processing device 10 (also referred to as "processing device") comprises more components than those shown in and described in the following.

The processing device 10 comprises an input unit 12 which is adapted to receive and process at least one motion picture signal (also called video signal). Preferably, the input unit 12 is adapted to receive and handle a video signal according to the HDMI 1.3/1.4 standard. More preferably, the input unit 12 is also adapted to receive analogue video signals, like S-video signals or RGB signals. The input unit 12 may also be adapted to receive and process video signals with higher frame rates (compared to the standard frame rates of PAL, SECAM or NTSC frame rates of 25 frames/s and 29.97 frames/s respectively), e.g. 100, 120, 200, 240 frames/s or more.

The processing device 10 also comprises a signal and delay generator 14, which provides several functions which will be described in detail below, and optionally a frame rate conversion unit 15 with motion compensation.

The signal and delay generator 14 receives a signal from the input unit 12 and provides a video signal to said frame rate conversion unit 15. The frame rate conversion unit 15 may process—if desired—the received signal, e.g. by increasing the frame rate and/or by applying a motion compensation, and provides an output signal to be transmitted to a display device 30, e.g. a TV set 30. Frame rate conversion and motion compensation are known methods which are used in many off-the-shelf TV sets so that it is refrained from describing these methods in detail.

Preferably, the output signal is a signal according to the HDMI 1.3/1.4 standard. The signal may be a video signal with higher frame rates requiring a high frame rate interface (HFR interface) on the display side.

It is to be noted that the present embodiments are described in connection with a TV set although other display devices, like a beamer etc., are also applicable. Moreover, the display device may comprise a unit for solely displaying motion pictures, like a beamer, an amplifier unit and a loudspeaker unit reproducing the associated sound.

The processing device 10 further comprises a 3D shutter glasses driver unit 16 (also called glass generator). The glass generator 16 receives signals, namely synchronization signals from the signal and delay generator 14 and generates on the basis of these synchronization signals driving signals to be transmitted to 3D shutter glasses 32. The driving signals transmitted to the shutter glasses 32 serve to open and close the left and right glasses alternately. Since this technique of presenting the left and right images of a motion picture to the left and right eye of a viewer, respectively, is generally known, it is refrained from explaining this technique.

In FIG. 1 it is indicated graphically that the glass generator 16 may be adapted to transmit the driving signal to the shutter glasses 32 wirelessly, for example by using infrared or radio frequency transmitting techniques, or alternatively by wire.

The processing device 10 further comprises a first analogue to digital converter 18 (also referred to as sound A/D) and a second analogue to digital converter 20 (also referred to as picture A/D). Both A/D converters are coupled with the signal delay generator meaning that they supply the converted digital signal to the signal and delay generator 14. The input of the sound A/D is coupled with a sound sensor 22, preferably a microphone, and the input of the picture A/D converter 20 is coupled with a photo sensor 24. Both sensors 22 and 24 generate an analogue signal, which is then converted into a digital signal by said A/D converter 18, 20.

The input unit 12 comprises a video signal converter unit 25 which is adapted to receive either a digital signal, like HDMI signals, or analogue signals, like S-video or RGB signals, and to convert these signals—if necessary, into a digital output signal.

The input unit further comprises an 2D to 3D converter unit 26 which is adapted to receive a 2D video signal and to output a 3D video signal. In other words, the converter unit enriches the video signal with depth information. Appropriate algorithms are known in the art so that it is refrained from explaining this in detail. At the end of this converting process, the video signal comprises separate pictures or frames for the left and right eye.

The 2D to 3D converter unit is used in case that the input video signal is a 2D video signal. If the input signal is a 3D video signal, the converter unit 26 may be bypassed.

The input unit 12 also comprises a picture format converter unit 27 which receives a 3D video signal and converts the format into a frame sequential format. In the art there are several possibilities to record or transmit the picture signals for the left and right eyes. Some of these possibilities are for example "side-by-side (SBS)", above-below (also known as upper-by-lower) or checkerboard. Since a 2D TV set is not able to decode video signals having these formats, the picture format converter unit converts these formats into a so-called frame sequential (FS) format. Frame sequential format means that the video signal comprises frames for the left and right eyes alternately (this requires that the TV set is in the progressive mode and not in the interlaced mode for displaying the video signal).

In a normal uncompensated operation mode, the signal and delay generator 14 generates a synchronization signal, which exactly reflects the change of a left to right image frame or right to left image frame. This synchronization signal is transmitted to the glass generator 16, which in turn transmits a driving signal to the shutter glasses 32. Hence, the shutter glasses are in synchronization with the frame changes in the signal and delay generator 14.

In the event that the TV set 30 receiving the video signal from the signal and delay generator 14 does not apply any delay on the video signal, the shutter glasses 32 are still in synchronization with the frame changes displayed by the TV set.

However, the plurality of modern TV sets applies a delay which is caused by several video signal processing steps. Hence, there is a time shift between the frame changes detected in the signal and delay generator 14 and the frame changes displayed on the screen of the TV set 30. The result of this time shift or time delay is that the shutter glasses 32 are not in synchronization anymore with the frame change of the TV set. Practically this means that for example the left side of the shutter glasses 32 for the left eye opens too early so that the left eye sees the right frame first and then the left frame.

This might result in blurring effects, which should be avoided.

In order to overcome this problem, the signal and delay generator 14 delay or time shifts the synchronization signal transmitted to the glass generator 16. The amount of delay or time shift depends on the processing time of the TV set 30.

In order to determine the amount of delay to be applied to the synchronization signal, there are several possible solutions, some of which are described below.

One possibility to determine the delay is to get a respective delay value from a memory in the processing device 10. The memory may comprise only one delay value or more preferably a plurality of different delay values in a look-up table 28. The look-up table contains a plurality of data pairs with a TV set identifier and a delay value. On the basis of the TV set identifier which could be requested by the processing device 10 from the TV set 30, the appropriate delay value can be determined by means of the look-up table 28.

It is apparent for a person skilled in the art that the look-up table 28 may not be necessarily be stored in the processing device 10. Rather it would also be possible to provide the look-up table 28 on any server accessible via the Internet. This solution is indicated in FIG. 1 by dashed lines.

A further possible solution to determine the delay is by running a calibration. During this calibration the processing time is measured. This can be achieved by using the photo sensor 24, which is adapted to detect a certain picture element within a test picture displayed on the screen of the TV set 30. By comparing the time the signal and delay generator 14 has provided the video signal to the TV set 30 and the time the picture element has been detected by the photo sensor 24, the processing time of the TV set 30 can be calculated. At the end of the calibration process, the calculated processing time is stored as the delay value used by the signal and delay generator 14.

The same calibration process may also be carried out for the sound via the sound sensor 22. This calibration process assures that no so-called lip synchronisation problem arises.

Generally, this calibration process is carried out every time the processing device 10 is coupled with a new TV set 30 provided that the processing time of a TV set 30 is constant over the time. On the other hand, it is also possible to run the calibration process periodically. It is also conceivable that the picture element to be detected by the photo sensor 24 is overlayed on the video signal, so that the calibration could be run during normal operation.

A further possibility to determine the delay value is by manually setting this value. In this case, the processing device 10 is equipped for example with a rotary knob which allows to shift the synchronization signal generated by the signal and delay generator. The user can shift the synchronization signal as long as he/she perceives a blurring effect.

To sum up, the processing device 10 allows to compensate for the processing time and hence delay of the TV set 30 so that the shutter glasses 32 are perfectly synchronized with the TV set 30.

The described processing device 10 may be designed as a stand alone device or may be incorporated into any other electronic device which may be coupled with a TV set 30. For example, the processing device 10 may be incorporated into a Blu-ray player, DVD player or AV-receiver.

Figure 2:
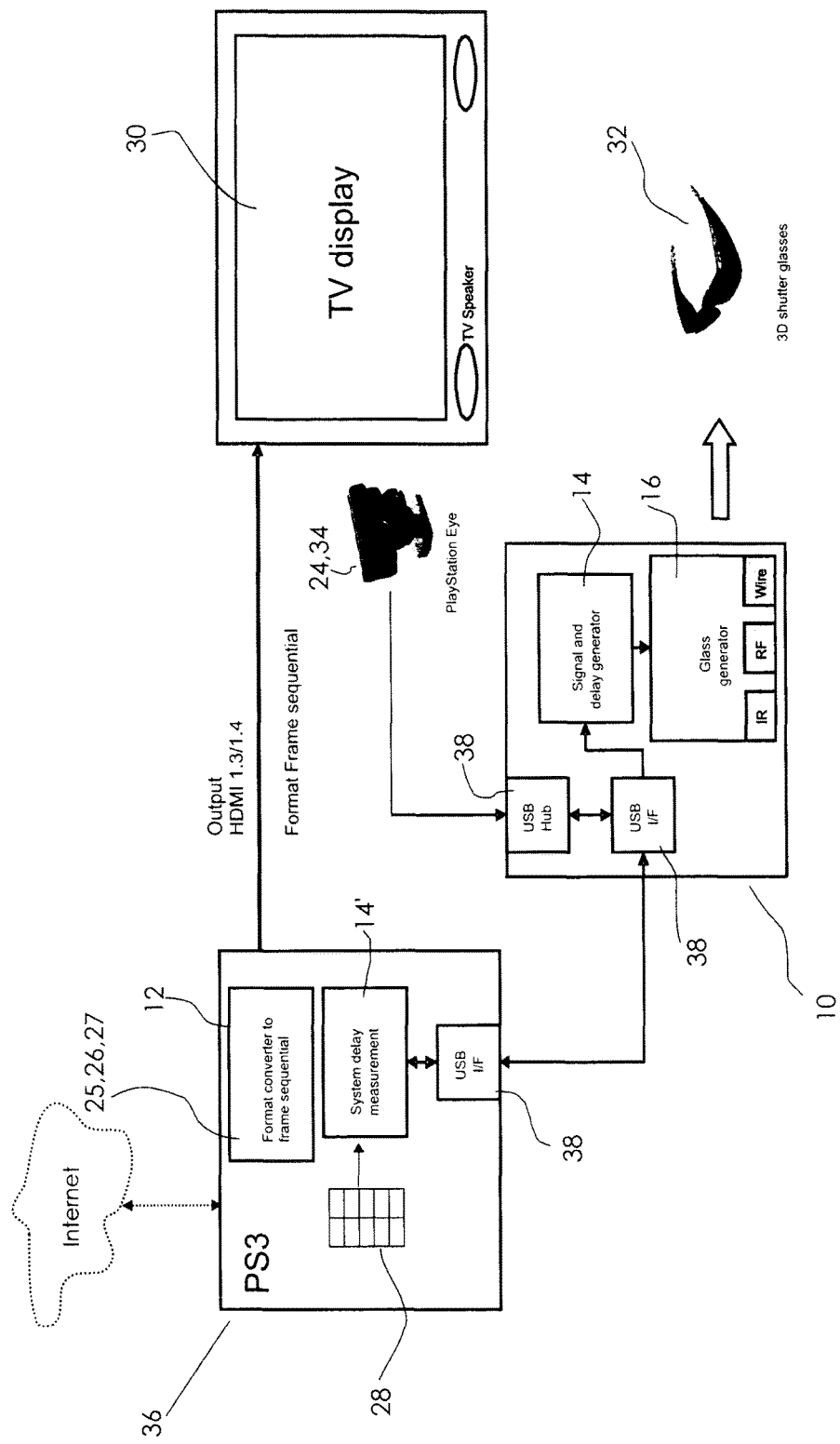
FIG. 2 shows a schematic block diagram of a second embodiment.

In FIG. 2 a further application of the processing device 10 is schematically shown. Here, the processing device 10 is integrated into a video game console 36. The processing device 10 comprises USB connections 38 allowing to connect the processing device 10 with the video game console 36. The function of the photo sensor 24 mentioned above may be provided by a camera 34 which is often part of the video game console 36.

As it is apparent from FIG. 2, the input unit 12 is part of the video game console 36. In particular, the video game console 36 is supplemented by a software module providing the function of the input unit 12 and hence also the functionality of the video signal converter unit 25, the 2D to 3D converter unit 26 and the picture format converter unit 27.

Further, the functionality of measuring the processing delay is shifted from the electronic device 10 to the video game console 36, which is indicated by reference numeral 14'. Also this functionality may be provided by a software module running on the very powerful processor of such a video game console 36.

The process of determining the processing delay and setting the appropriate synchronization is similar to the process described above with reference to FIG. 1. It is therefore refrained from repeating it again.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A three-dimensional (3D) picture processing device comprising:
    circuitry configured to:
    receive a video signal,
    output the video signal to a display device,
    generate a driving signal to control 3D shutter glasses to view the display device,
    overlay periodically, on the video signal, a test picture element to be used for measuring a processing delay value of the display device to process the video signal so that the measuring of the processing delay value can be run during a normal operation of outputting the video signal,
    detect, using a photo sensor adapted to detect the test picture element, the overlaid test picture element as periodically displayed by the display device,
    compare a first time the circuitry has outputted the video signal with the overlaid test picture element to the display device and a second time the overlaid test picture element has been detected as displayed by the display device,
    calculate an amount of time between the first time and the second time as the processing delay value, and
    compensate for a processing delay of the display device by delaying or time shifting the driving signal to control the 3D shutter glasses based on the calculated processing delay value.

2. The device according to claim 1, wherein said circuitry is operated continuously and is configured to store the measured processing delay value.

3. The device according to claim 1, further comprising:
    an acoustical sensor to detect sound elements reproduced by the display device, wherein
    said circuitry is configured to determine processing delay between the output of the video signal comprising the sound elements by said circuitry and the reproduction of said sound elements by the display device.

4. The device according to claim 1, wherein the video signal is a two-dimensional (2D) video signal, and said circuitry is configured to convert the 2D video signal to a 3D video signal, and output the 3D video signal.

5. The device according to claim 1, wherein the video signal is an analog or digital video signal.

6. The device according to claim 5, wherein the input video signal is one of an HDMI signal, an S-Video signal, an RGB signal, and an HFR interface signal, and said output video signal is an HDMI signal or an HFR interface signal.

7. The device according to claim 1, wherein said circuitry is configured to convert a 3D source format of the video signal into a 3D frame sequential format.

8. The device according to claim 7, wherein said 3D source format is one of a side-by-side format, an upper-by-lower format, and a checkerboard format.

9. The device according to claim 1, wherein said device is provided as a stand-alone box operating independently of a display device.

10. The device according to claim 1, wherein said device is part of a video game console.

11. The device according claim 1, wherein said device is part of a video game console, and said photo sensor is a camera coupled to said video game console.

12. The device according to claim 1, further comprising the 3D shutter glasses.

13. The device according to claim 1, wherein said display device is a TV set.

14. A video game console comprising the device according to claim 1.

15. A method for processing a picture signal to be transmitted to a display device, comprising:
receiving a two-dimensional (2D) or three dimensional (3D) picture signal from a source,
generating a driving signal to control 3D shutter glasses to view the display device,
providing a 3D picture signal to be transmitted to said display device,
overlaying periodically, on the video signal, a test picture element to be used for measuring a processing delay value of the display device to process the video signal so that the measuring of the processing delay value can be run during a normal operation of outputting the video signal,
detecting, using a photo sensor adapted to detect the test picture element the overlaid test picture element as periodically displayed by the display device,
comparing a first time the circuitry has outputted the video signal with the overlaid test picture element to the display device and a second time the overlaid test picture element has been detected as displayed by the display device,
calculating an amount of time between the first time and the second time as the processing delay value, and
compensating, using circuitry, for a processing delay of said display device by delaying or time shifting the driving signal to control the 3D shutter glasses based on the calculated processing delay value.

16. The method according to claim 15, further comprising:
detecting sound elements reproduced by the display device, and
determining processing delay between providing the motion picture signal comprising said sound elements and detecting said sound elements.

17. The method according to claim 15, wherein in a case where the 2D picture signal is received from the source, the method further comprises:
converting said 2D picture signal into a 3D picture signal.

18. The method according to claim 15, further comprising:
converting said picture signal from said source into a digital signal.

19. The method according to claim 18, wherein said picture signal from said source is one of an HDMI signal, an S-Video signal, an RGB signal, and an HFR interface signal, and said digital signal is an HDMI signal or an HFR interface signal.

20. The method according to claim 15, wherein the photo sensor is one of an optical sensor, and a camera adapted to detect said overlaid test picture element.

21. The method according to claim 15, wherein said 3D shutter glasses are LCD shutter glasses.

22. The method according to claim 15, further comprising:
converting a source format of the picture signal into a frame sequential format.

23. The method according to claim 22, wherein said source format is one of a side-by-side format, an upper-by-lower format, and a checkerboard format.

24. The method according to claim 15, wherein the display device is a TV set.

\* \* \* \* \*